(12) United States Patent
Wu et al.

(10) Patent No.: US 9,541,794 B2
(45) Date of Patent: Jan. 10, 2017

(54) HIGH DYNAMIC RANGE LIQUID CRYSTAL DISPLAY

(71) Applicant: Apple Inc., Cupertino, CA (US)

(72) Inventors: Jiaying Wu, San Jose, CA (US); Wei Chen, Palo Alto, CA (US); Cheng Chen, San Jose, CA (US); William Mathews Riedel, Palo Alto, CA (US); Jun Qi, Cupertino, CA (US); John Z. Zhong, Cupertino, CA (US); Gabriel Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 14/502,199

(22) Filed: Sep. 30, 2014

(65) Prior Publication Data

US 2015/0198834 A1    Jul. 16, 2015

Related U.S. Application Data

(60) Provisional application No. 61/926,012, filed on Jan. 10, 2014.

(51) Int. Cl.
*G02F 1/1347* (2006.01)
*G02F 1/1335* (2006.01)
(Continued)

(52) U.S. Cl.
CPC ......... *G02F 1/13363* (2013.01); *G02F 1/1336* (2013.01); *G02F 1/1368* (2013.01);
(Continued)

(58) Field of Classification Search
None
See application file for complete search history.

(56) References Cited

U.S. PATENT DOCUMENTS 5,153,760 A    10/1992  Ahmed
5,742,367 A     4/1998  Kozaki
(Continued)

FOREIGN PATENT DOCUMENTS

EP    1930750        11/2008
WO   2006056956     6/2006
WO   2014025677     2/2014

OTHER PUBLICATIONS

Chen et al., U.S. Appl. No. 13/854,651, filed Apr. 1, 2013.

*Primary Examiner* — Ryan Crockett
(74) *Attorney, Agent, or Firm* — Treyz Law Group, P.C.; G. Victor Treyz; Joseph F. Guihan

(57) ABSTRACT

A display may have a first stage such as a color liquid crystal display stage and a second stage such as a monochromatic liquid crystal display stage that are coupled in tandem so that light from a backlight passes through both stages. The dynamic range of the display may be enhanced by using the second stage to perform local dimming operations. The pixel pitch of the second stage may be greater than the pixel pitch of the first stage to ease alignment tolerances and reduce image processing complexity. The color stage and monochromatic stages may share a polarizer. A color filter in the color stage may have an array of red, green, and blue elements or an array of white, red, green, and blue elements. The color stage may be a fringe field display and the monochrome stage may be an in-plane switching display or a twisted nematic stage.

10 Claims, 16 Drawing Sheets

(51) Int. Cl.
 *G02F 1/13363* (2006.01)
 *G02F 1/1368* (2006.01)
(52) U.S. Cl.
 CPC .... *G02F 1/13471* (2013.01); *G02F 1/133514* (2013.01); *G02F 1/133528* (2013.01); *G02F 2001/133614* (2013.01); *G02F 2413/13* (2013.01); *G02F 2413/14* (2013.01)

(56) References Cited

U.S. PATENT DOCUMENTS

| | | |
|---|---|---|
| 8,207,933 B2 | 6/2012 | Shin et al. |
| 8,294,736 B2 | 10/2012 | Hirata |
| 8,848,118 B1 | 9/2014 | Hsiao et al. |
| 2004/0125284 A1 | 7/2004 | Lee et al. |
| 2006/0187378 A1* | 8/2006 | Bong et al. ....... G02F 1/133603 349/69 |
| 2008/0072163 A1 | 3/2008 | Teng et al. |
| 2008/0088649 A1 | 4/2008 | Ikeno et al. |
| 2009/0021458 A1 | 1/2009 | Drazic et al. |
| 2009/0027598 A1* | 1/2009 | Ikeno ................. G02F 1/13471 349/77 |
| 2011/0007089 A1 | 1/2011 | Bell et al. |
| 2011/0080417 A1 | 4/2011 | Lin et al. |
| 2011/0141769 A1* | 6/2011 | Lee ..................... G02B 6/0023 362/629 |
| 2011/0164047 A1 | 7/2011 | Pance |
| 2011/0279749 A1 | 11/2011 | Erinjippurath et al. |
| 2012/0099048 A1 | 4/2012 | Yamazaki et al. |
| 2012/0224121 A1 | 9/2012 | Gilbert |
| 2012/0262653 A1 | 10/2012 | Shimizu et al. |
| 2012/0287182 A1 | 11/2012 | Botzas |
| 2012/0327136 A1 | 12/2012 | Uehara et al. |
| 2013/0106923 A1 | 5/2013 | Shields et al. |
| 2013/0148376 A1* | 6/2013 | Nick .................... G02B 6/0001 362/559 |
| 2013/0286314 A1* | 10/2013 | Yoshida ............ G02F 1/136227 349/43 |
| 2013/0342781 A1* | 12/2013 | Lee ..................... G02F 1/1368 349/46 |

* cited by examiner

HIGH DYNAMIC RANGE LIQUID CRYSTAL DISPLAY

This application claims the benefit of provisional patent application No. 61/926,012, filed Jan. 10, 2014, which is hereby incorporated by reference herein in its entirety.

BACKGROUND

This relates generally to electronic devices and, more particularly, to electronic devices with displays.

Electronic devices often include displays. For example, cellular telephones, computers, and televisions have displays.

Liquid crystal displays create images by modulating the intensity of light that is being emitted from a backlight. The perceived quality of a liquid crystal display is affected by its dynamic range. The dynamic range of a display is the ratio of the output of the display at its brightest setting to the output of the display at its dimmest setting. Because it is not possible to completely extinguish the light produced by the backlight in a liquid crystal display, the dynamic range of a liquid crystal display is limited. A typical liquid crystal display has a dynamic range of about 1000:1. When viewing content such as movies where dark areas are often present, the limited dynamic range of a conventional display can have an adverse impact on picture quality. For example, black areas of an image may appear to be dark gray rather than black.

It would therefore be desirable to be able to provide improved displays such as improved liquid crystal displays.

SUMMARY

Electronic devices may be provided with displays. A display may have a first stage such as a color liquid crystal display stage and a second stage such as a monochromatic liquid crystal display stage. The first and second stages may be coupled in series so that light from a backlight passes through both the first and second stages. The first stage may be used to display color images. The second stage may be used to perform local dimming operations, thereby enhancing the dynamic range of the display. The pixel pitch of the second stage may be greater than the pixel pitch of the first stage to ease alignment tolerances and reduce image processing complexity.

The color stage and monochromatic stage may share a polarizer or separate sets of polarizers may be used for the color stage and for the monochromatic stage. A polarizer may include compensation layers. A shared polarizer may have a polarizer layer that is sandwiched between upper and lower sets of compensation films.

A color filter in the color stage may have an array of red, green, and blue elements or an array of white, red, green, and blue elements. Display control circuitry may be used to perform color space conversion operations and to split image data into a color channel for the color stage and a monochromatic channel for the monochromatic stage.

The color stage of the display may be a fringe field display and the monochrome stage may be an in-plane switching display or a twisted nematic stage. The backlight in the display may have a quantum dot structure that is illuminated with a blue light source.

DETAILED DESCRIPTION

Electronic devices may be provided with displays. The displays may be liquid crystal displays. To enhance dynamic range, a display may be provided with multiple stages. For example, a display may be provided with tandem upper and lower display stages. One of the stages (e.g., the upper stage) may have an array of pixels and a corresponding color filter layer that provide the upper stage with the ability to display color images. Another of the stages (e.g., the lower stage) may have an array of pixels that serve as monochromatic light shutters to selectively increase the dimming of sections of the higher resolution color display pixels. If, for example, an area of dark content is being displayed by the display, the lower stage may be adjusted to add additional dimming to the dark content area. The use of the lower stage therefore helps enhance the dynamic range of the display.

Because localized dimming from the lower stage need not be performed at the same resolution as the array of pixels in the upper stage, the lower stage may have pixels that are larger than the display pixels of the upper stage. If desired, a high dynamic range multi-stage display may have three or more tandem stages. The use of displays with a pair of tandem stages is described herein as an example.

Illustrative electronic devices of the types that may be provided with high dynamic range displays are shown in FIGS. 1, 2, 3, and 4.

Figure 1:
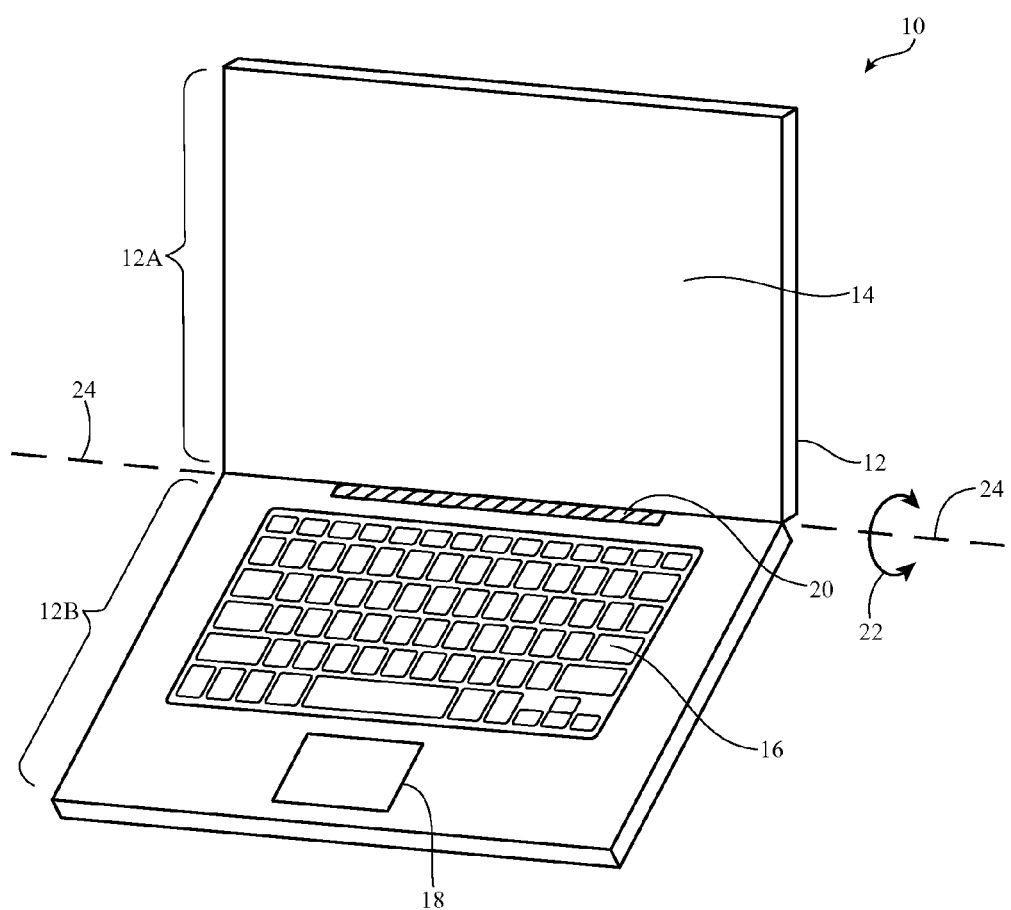
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
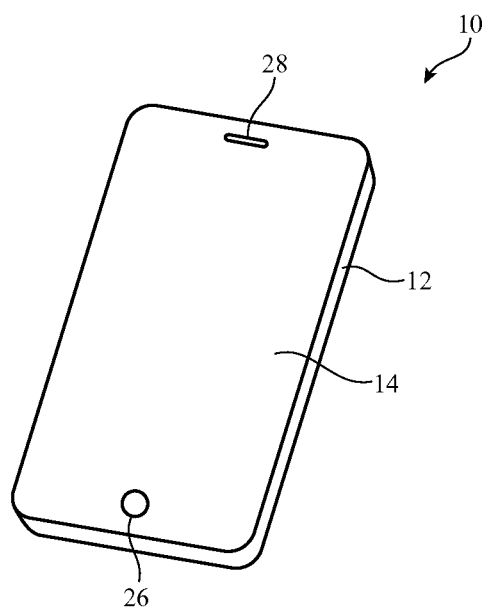
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
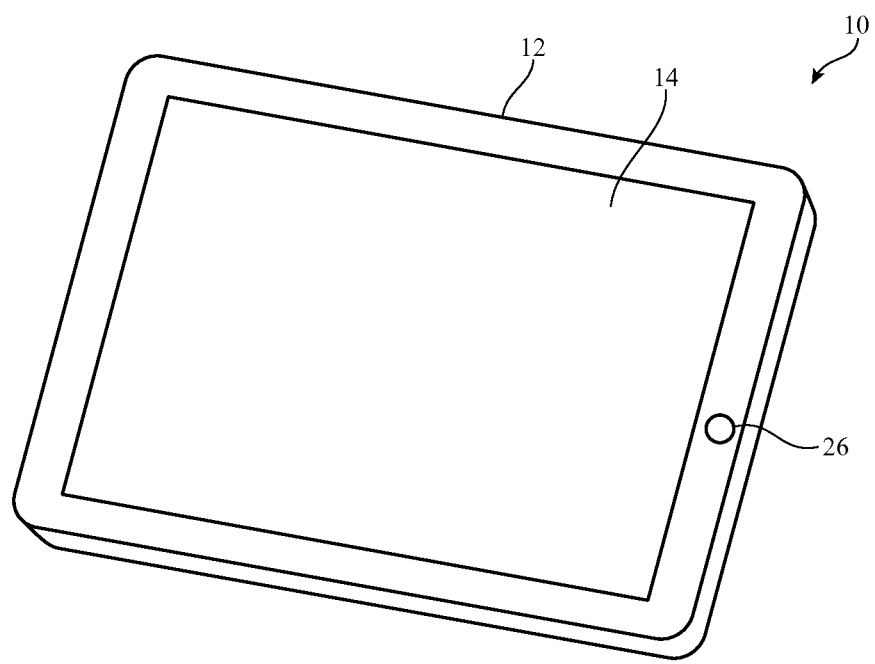
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
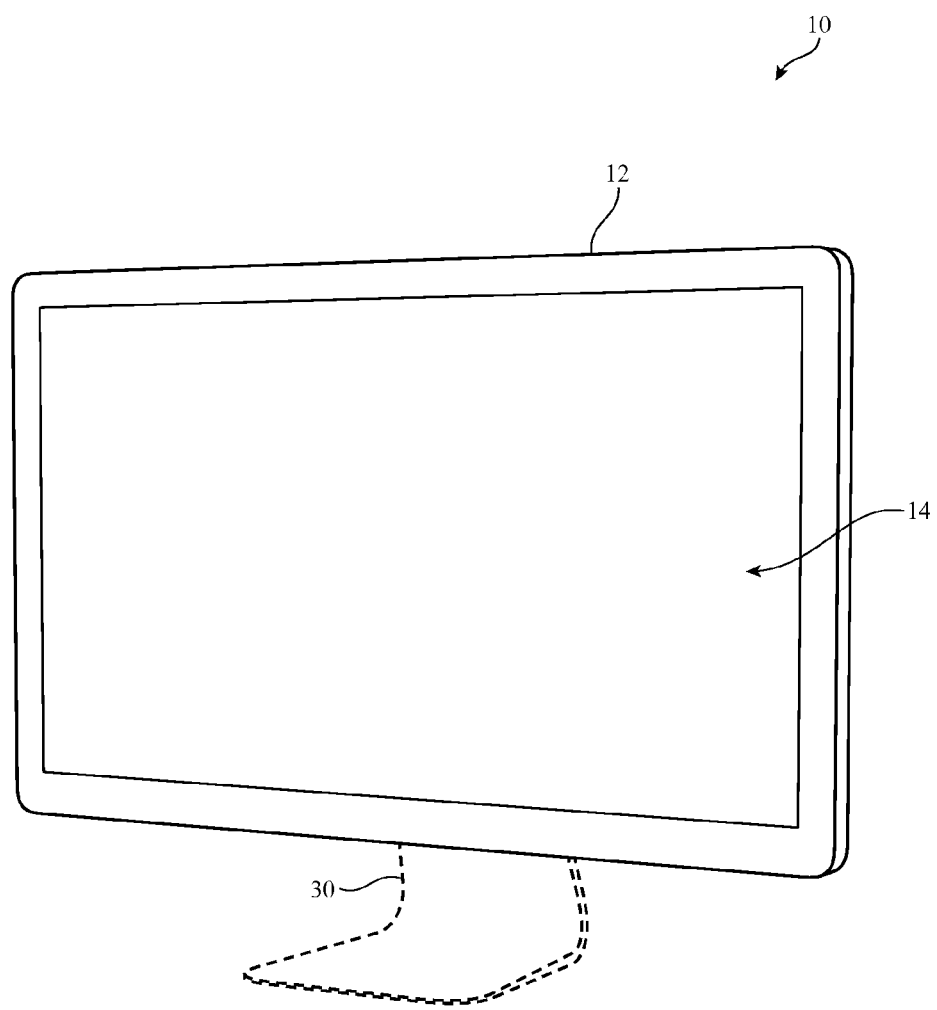
FIG. 4 is a perspective view of an illustrative electronic device such as a display for a computer or television with display structures in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a tabletop or desk.

Display 14 may be a liquid crystal display having multiple layers of liquid crystal material in multiple respective stages. For example, display 14 may have an upper liquid crystal layer in an upper stage and a lower liquid crystal layer in a lower stage. Using a two-stage configuration of display 14 may enhance the dynamic range of display 14.

Figure 5:
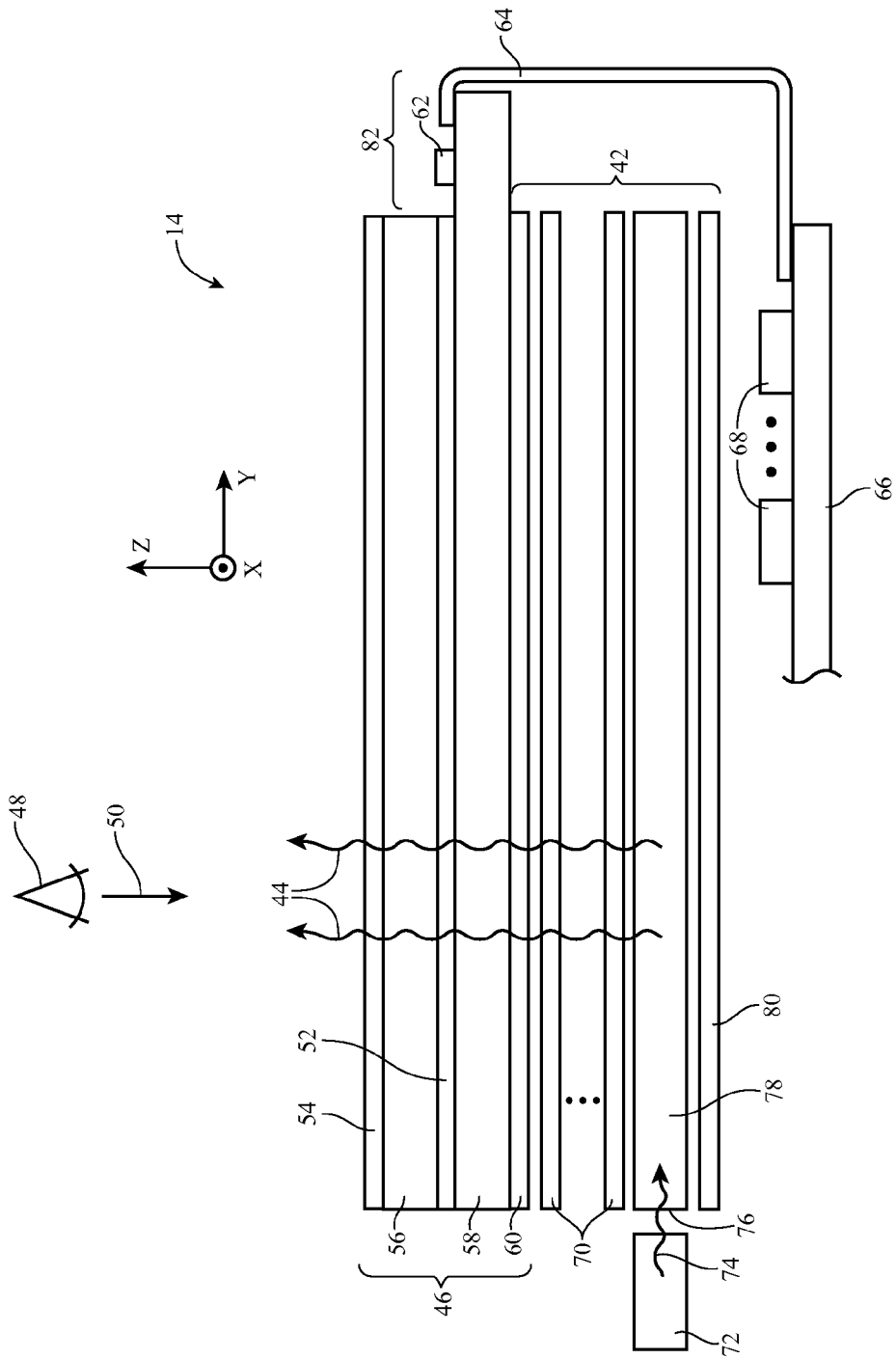
FIG. 5 is a cross-sectional side view of illustrative display structures in accordance with an embodiment.

A cross-sectional side view of an illustrative one-stage liquid crystal display is shown in FIG. 5. As shown in FIG. 5, display 14 may include a backlight such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control (e.g., one or more integrated circuits on a printed circuit such as integrated circuits 68 on printed circuit 66) may be used to generate information to be displayed on display 14 (e.g., display data). The information to be displayed may be conveyed to a display driver integrated circuit such as circuit 62 in region 82 using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic, a layer of metal, or other shiny materials.

To enhance backlight performance for backlight structures 42, backlight structures 42 may include optical films 70. Optical films 70 may include diffuser layers for helping to homogenize backlight 44 and thereby reduce hotspots, optical compensation films for optically compensating layers in display 14 and thereby enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, compensation films may be incorporated into other portions of display 14. For example, compensation films may be incorporated into polarizers.

Figure 6:
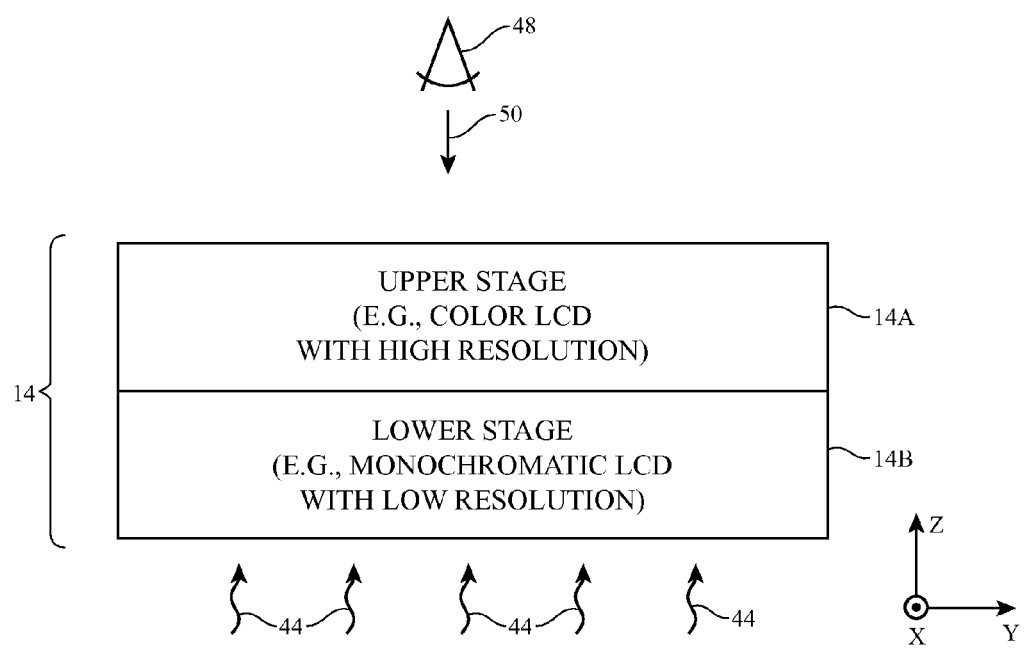
FIG. 6 is a cross-sectional side view of an illustrative two stage liquid crystal display in accordance with an embodiment.

The dynamic range of a single-stage display of the type shown in FIG. 5 can be enhanced by incorporating one or more additional liquid crystal display stages into display 14. As shown in FIG. 6, display 14 may, for example, be provided with a pair of tandem display stages such as upper stage 14A and lower stage 14B.

To provide display 14 with the ability to display images, display 14 may be provided with an array of color filter elements. The color filter element array may be formed by patterning colored photoimageable polymer areas on the underside of a transparent glass or plastic substrate (see, e.g., color filter layer 56 of FIG. 5). Only one of the display stages in display 14 need be provided with a color filter array. In the example of FIG. 6, upper stage 14A has an array of color filter elements and lower stage 14B does not have any color filter elements. Lower stage 14B is a monochromatic (gray-level) display that can modulate the intensity of backlight 44, but does not impart color information to backlight 44. Upper stage 14A contains a color filter array and has corresponding pixels to create color images for viewer 48. Because upper stage 14A has the ability to display color images, upper stage 14A may sometimes be referred to as a color stage. Because lower stage 14B displays only pixels of varying shades of gray (ranging from black to white), lower stage 14B may sometimes be referred to as a monochromatic stage, shutter stage, or localized dimming stage. In the illustrative configuration of FIG. 6, the upper stage of display 14 is a color stage and the lower stage of display 14 is a monochromatic stage, but the upper stage may be monochromatic and the lower stage may be a color stage, if desired.

It is not necessary for both display stages in display 14 to be high resolution stages (i.e., both stages need not have small pixel pitches). Rather, one of the stages such as upper stage 14A may have a relatively high resolution (e.g., the overall display resolution desired for display 14), whereas the other stage such as lower stage 14B may have a reduced resolution. Local stage 14B may be used to apply local dimming to dark areas of the image being displayed on display 14, rather using stage 14B to display full-resolution images. The use of localized dimming helps enhance dynamic range. For example, in an image that has dark areas, the darkness of the dark areas can be enhanced by locally dimming the dark areas with stage 14B (i.e., by creating additional dimming in addition to darkening the pixels of the dark areas with stage 14A).

Figure 7:
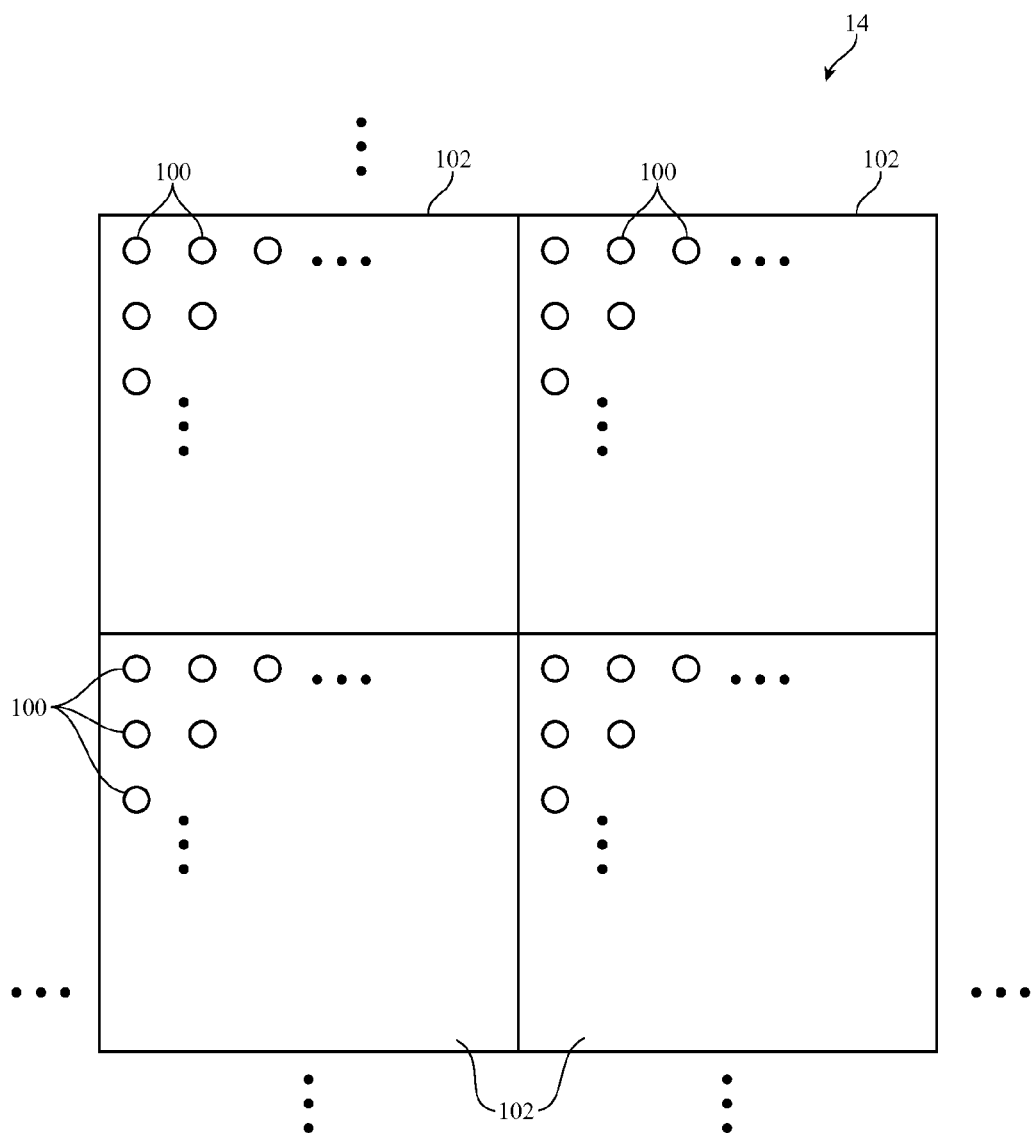
FIG. 7 is a top view of an illustrative two stage liquid crystal display showing how lower resolution monochromatic localized dimming pixels in one stage may overlap multiple higher resolution color display pixels in another stage in accordance with an embodiment.

FIG. 7 is a top view of an illustrative layout that may be used for the pixels in display 14. High resolution pixels 100 may be part of upper stage 14A and may be arranged in an array having numerous rows and columns. The color filter array in upper stage 14A may have a corresponding array of color filter elements. Each color filter element in upper stage 14A may be associated with a corresponding one of pixels 100 in upper stage 14A. Low resolution (local dimming) pixels such as pixels 102 may overlap sets of high-resolution display pixels 100. Local dimming pixels 102 in lower (local dimming) stage 14B may be formed in an array having fewer rows and columns than the array formed form pixels 100 in upper stage 14A. In particular, the pixel-to-pixel spacing ("pixel pitch") of pixels 100 may be less than the pixel pitch of pixels 102. In the example of FIG. 7, each local dimming pixel 102 overlaps a 10×10 subarray of display pixels 100 so that each local dimming pixel 102 is used in performing local dimming operations for a set of 100 pixels 100 in upper stage 14A (i.e., the pixel pitch of pixels 100 is one tenth of the pixel pitch of pixels 102). If desired, larger or smaller numbers of pixels 100 may be covered by each local dimming display pixel 102 (i.e., the pixel pitch of pixels 100 may be another suitable fraction of the pixel pitch of pixels 102).

Figure 8:
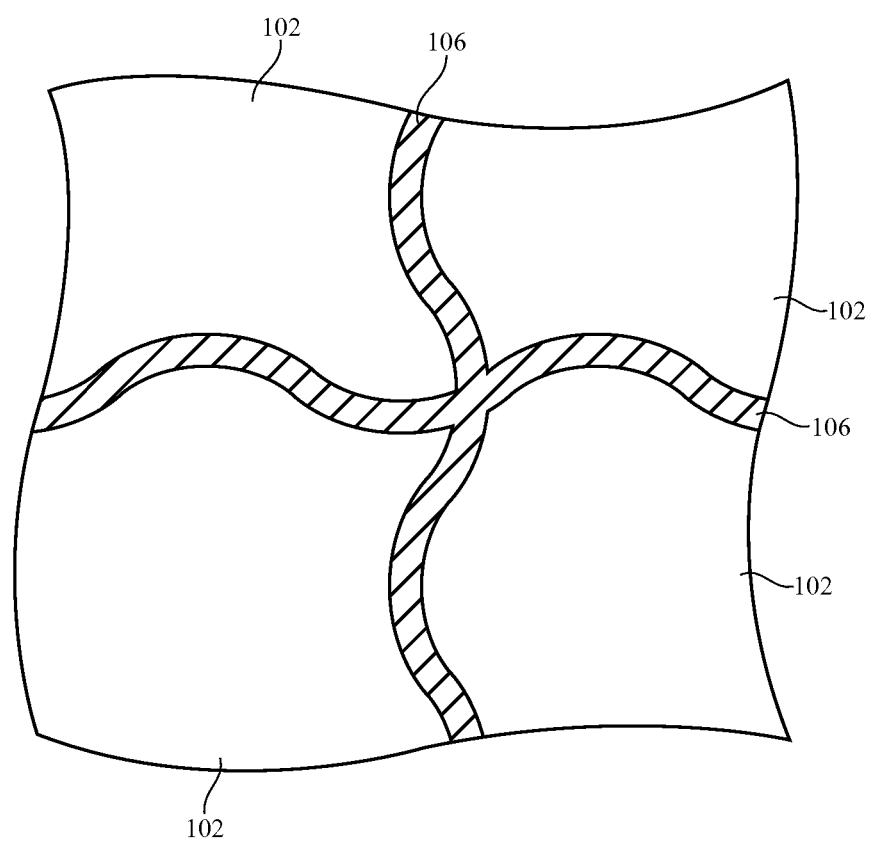
FIG. 8 is a top view of a portion of a display in accordance with an embodiment.

Pixels in display 14 may have associated borders formed from an opaque layer of material that is sometimes referred to as black mask. To minimize potential visible artifacts such as Moiré patterns due to optical interference between the array of pixels 100 in stage 14A and the array of pixels 102 in stage 14B, the black mask patterns used around the borders of pixels 102 may be provided with a wavy shape, as shown by black mask 106 in the portion of display stage 14B that is shown in FIG. 8. Wavy lines of black mask 106 may, for example, be provided in an undulating sinusoidal pattern. Other shapes for the lines of black mask in display 14 may be used, if desired. The illustrative wavy black mask pattern of FIG. 8 is merely illustrative.

Figure 9:
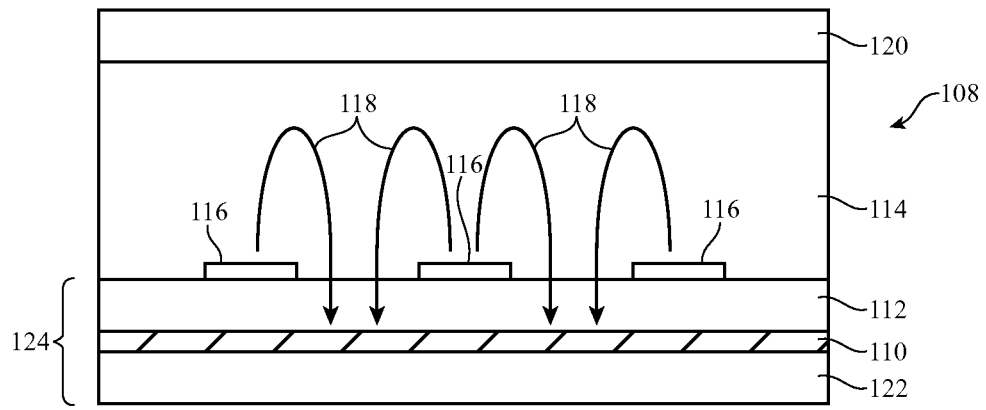
FIG. 9 is a cross-sectional side view of a pixel in an illustrative fringe field switching display stage in accordance with an embodiment.
Figure 10:
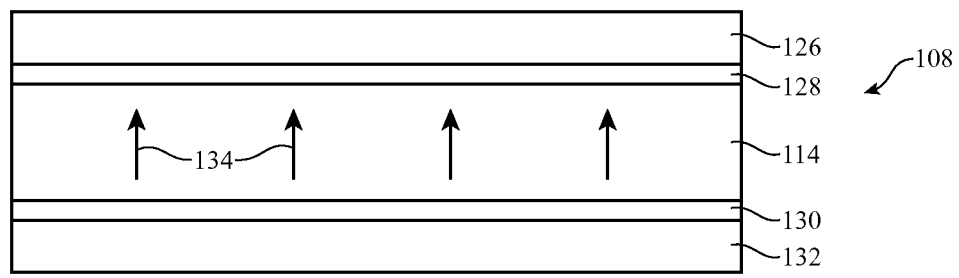
FIG. 10 is a cross-sectional side view of a pixel in an illustrative twisted nematic display stage in accordance with an embodiment.
Figure 11:
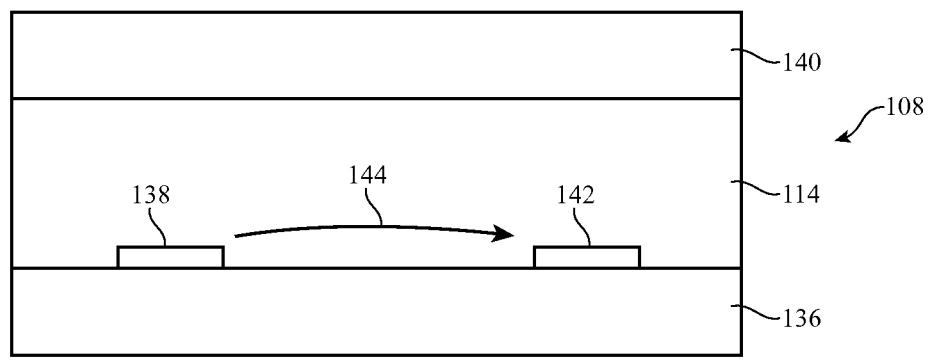
FIG. 11 is a cross-sectional side view of a pixel in an illustrative in-plane switching display in accordance with an embodiment.

Stages 14A and 14B may be formed using any suitable type or types of liquid crystal display technology. FIGS. 9, 10, and 11 are cross-sectional side views of illustrative pixels (without upper and lower polarizer layers) that may be used in stage 14A and/or stage 14B.

An illustrative configuration for a pixel in stage 14A and/or stage 14B of the type that is sometimes referred to as a fringe field switching (FFS) pixel is shown in FIG. 9. In this type of arrangement, a display pixel 108 (e.g., display pixel 100 in stage 14A or display pixel 102 in stage 14B) may have liquid crystal layer 114. Electric field lines 118 are established between electrode fingers 116 on dielectric layer 112 and electrode 110. The strength of electric field 118 controls the orientation of the liquid crystals in layer 114 and is used for controlling the operation of display pixel 108. Layer 122 may be a substrate for thin-film transistor layer 124. Layer 120 may be a color filter layer for a color display stage or a transparent substrate for a monochrome display stage.

An illustrative configuration for pixel 108 of the type that is sometimes referred to as twisted nematic pixel is shown in FIG. 10. In this arrangement, liquid crystal layer 114 of display pixel 108 (e.g., display pixel 100 in stage 14A or display pixel 102 in stage 14B) is sandwiched between a upper electrode 128 on substrate 126 and lower electrode 130 on substrate 132. Electric field 134 can be adjusted by adjusting the voltage between electrodes 128 and 130. In a monochrome display stage, substrate 126 may be a transparent substrate layer and layer 132 may be a thin-film transistor layer (as an example).

An illustrative configuration for pixel 108 of the type that is sometimes referred to as an in-plane switching pixel is shown in FIG. 11. In this arrangement, liquid crystal layer 114 is sandwiched between substrate layers 140 and 136. A voltage is applied across electrodes 138 and 142, giving rise to controllable electric field strength for electric field 144. The strength of electric field 144 controls the light transmission through display pixel 108. Layer 136 (and electrodes 138 and 142) may form a thin-film transistor layer. Layer 140 may be a color filter layer for a color display stage or a transparent substrate for a monochrome display stage.

In general, any of the display pixel designs of FIGS. 9, 10, and 11 or other suitable display pixel designs may be used in stage 14A and/or in stage 14B. With one suitable arrangement upper stage 14A is a fringe field switching stage using pixels of the type shown in FIG. 9 to provide display 14 with the ability to produce satisfactory images (e.g., images with satisfactory color gamut, etc.) and lower stage 14B is an in-plane switching display stage using in-plane pixels of the type shown in FIG. 11 or is a twisted nematic display stage using twisted nematic display pixels of the type shown in FIG. 10. In-plane switching stages and twisted nematic stages can offer desirable off-axis viewing performance characteristics (i.e., these stages can have off-axis performance patterns that are spatially distributed in a different way than fringe field switching stages), so the use of an in-plane switching design or twisted nematic design for lower stage 14B may help avoid poor off-axis performance for display 14. Designs for lower stage 14B such as twisted nematic designs may also exhibit high aperture ratios and may exhibit flat (wavelength-independent) transmission spectra in the visible light range. In-plane switching designs for lower stage 14B may offer benefits such as simplified polarizer selection. Other types of displays may be used in forming stages 14A and 14B and other combinations of stages in a two-stage display may be used, if desired. The use of a fringe field upper stage and an in-plane switching or twisted nematic lower stage (or vice versa) is merely illustrative.

Figure 12:
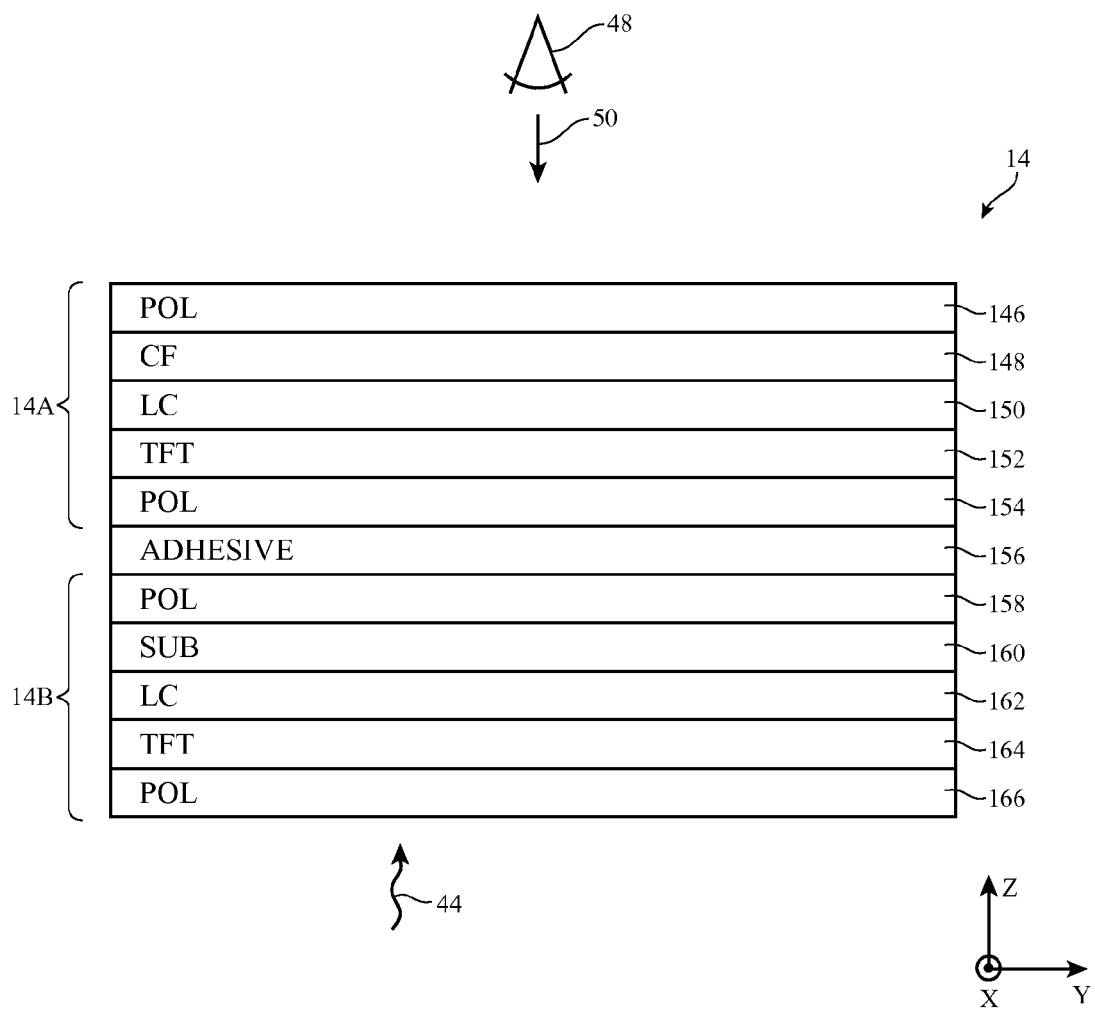
FIG. 12 is a cross-sectional side view of an illustrative display having a pair of tandem stages in accordance with an embodiment.

FIG. 12 is a cross-sectional side view of an illustrative two-stage display. As shown in FIG. 12, display 14 has upper stage 12A and lower stage 12B. Upper stage 14A has upper polarizer 146 and lower polarizer 154. Liquid crystal layer 150 is interposed between color filter layer 148 and thin-film transistor layer 152. Upper stage 14A may be a fringe field display stage or other suitable type of display stage. Color filter layer 148 may contain an array of color filter elements to provide upper stage 14A with the ability to display color images. If desired, the positions of color filter layer 148 and thin-film transistor layer 152 may be swapped or other display configurations may be used for stage 12A. The configuration of FIG. 12 is merely illustrative. Adhesive 156 may be used to attach upper stage 14A to lower stage 14B. Adhesive layers may also be used elsewhere in display 14 to attach layers of material to each other. Adhesives such as adhesive layer 156 may be formed from liquid adhesive or pressure sensitive adhesive.

Lower stage 14B of FIG. 12 may have upper polarizer 158 and lower polarizer 166. Liquid crystal layer 162 is interposed between substrate layer 160 and thin-film transistor layer 164. Substrate layer 160 may be a clear layer of glass or plastic that does not contain any color filter elements (i.e., stage 14B may be a monochromatic display stage). Rather, display 14 may be provided with the ability to display color images due to the presence of color filter layer 148 in upper stage 14A. The omission of color filter elements from substrate 160 helps enhance light transmission and ease alignment tolerances. Alignment issues, optical interference issues, and control complexity can also be minimized by ensuring that stage 14B has a greater pixel pitch than the pixels of stage 14A (i.e., stage 14B has a lower resolution than stage 14A).

Figure 13:
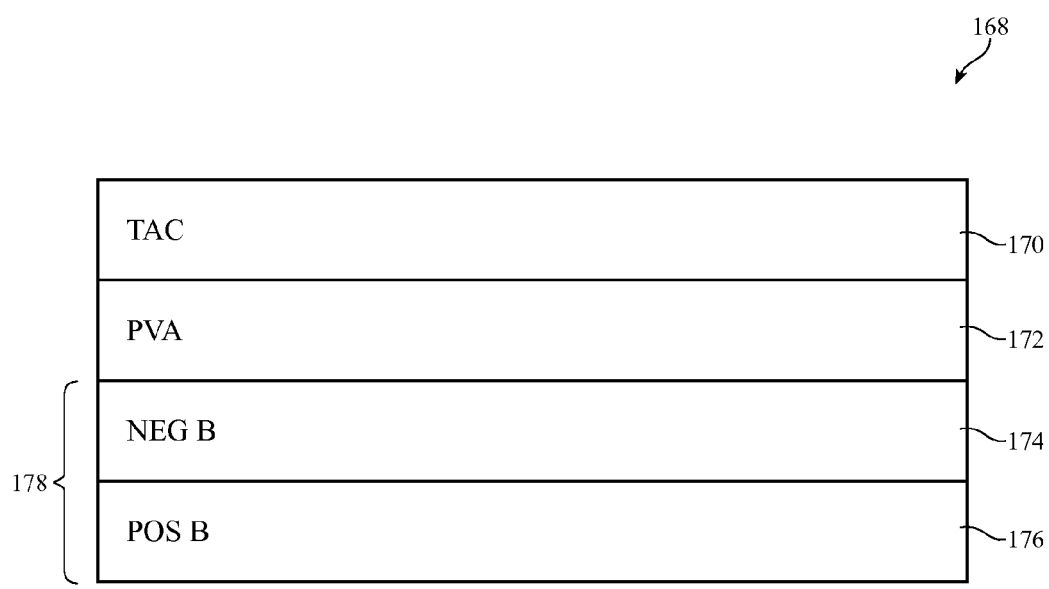
FIG. 13 is a cross-sectional side view of an illustrative polarizer that may be used in a display of the type shown in FIG. 12 in accordance with an embodiment.

FIG. 13 is a cross-sectional side view of an illustrative polarizer that may be used in display 14. As shown in FIG. 8, polarizer 168 may have a polymer polarizer film such as polarizer layer 172. Layer 152 may be formed from a stretched polymer such as stretched polyvinyl alcohol (PVA) and may therefore sometimes be referred to as a PVA layer. A dichroic dye such as iodine or dichroic organic pigments may be added to the stretched PVA film to provide polarizer 168 with the ability to polarize light. Iodine may, for example, be coated onto the surface of layer 172 or may otherwise be used to dope layer 172. Molecules of iodine align with the stretched film of layer 172 and form the active polarizing layer of polarizer 168. Other polarizer films may be used if desired.

Polarizer film 172 may be sandwiched between other polymer layers. For example, the upper portion of layer 172 may be covered with one or more layers such as protective layer 170. If desired, functional layers may also be added to polarizer 168 (e.g., antireflection films, antismudge and antiscratch coatings, etc.). Protective layer 170 may be formed from a clear polymer. For example, layer 170 may be formed from a material such as tri-acetyl cellulose (TAC) and may sometimes be referred to as a TAC film. The TAC layer or other layer may help support and protect the PVA film. Other films may be laminated to polarizer layer 172 if desired. For example, lower layer(s) 178 may be attached to the lower surface of polarizer layer 172. As shown in FIG. 13, lower layers 178 may be formed from one or more compensation films (i.e., birefringent films such as cyclic olefin polymer films) such as negative birefringence compensation layer 174 and positive birefringence compensation layer 176. The compensation layers enhance off-axis viewing performance for display 14. Polarizer 168 of FIG. 13 may be used to form polarizer 146 of FIG. 12, polarizer 154 of FIG. 12, polarizer 158 of FIG. 12, and/or polarizer 166 of FIG. 12. In some polarizers in display 14, compensation films 178 may be omitted. As one example, compensation films 178 may be included in polarizer 146 and polarizer 158 but may be omitted from polarizer 154 and 166. Compensation films may also be incorporated into layers 70 (FIG. 5). If desired, the lowermost polarizer in display 14 may be a reflective polarizer to enhance backlight efficiency.

Figure 14:
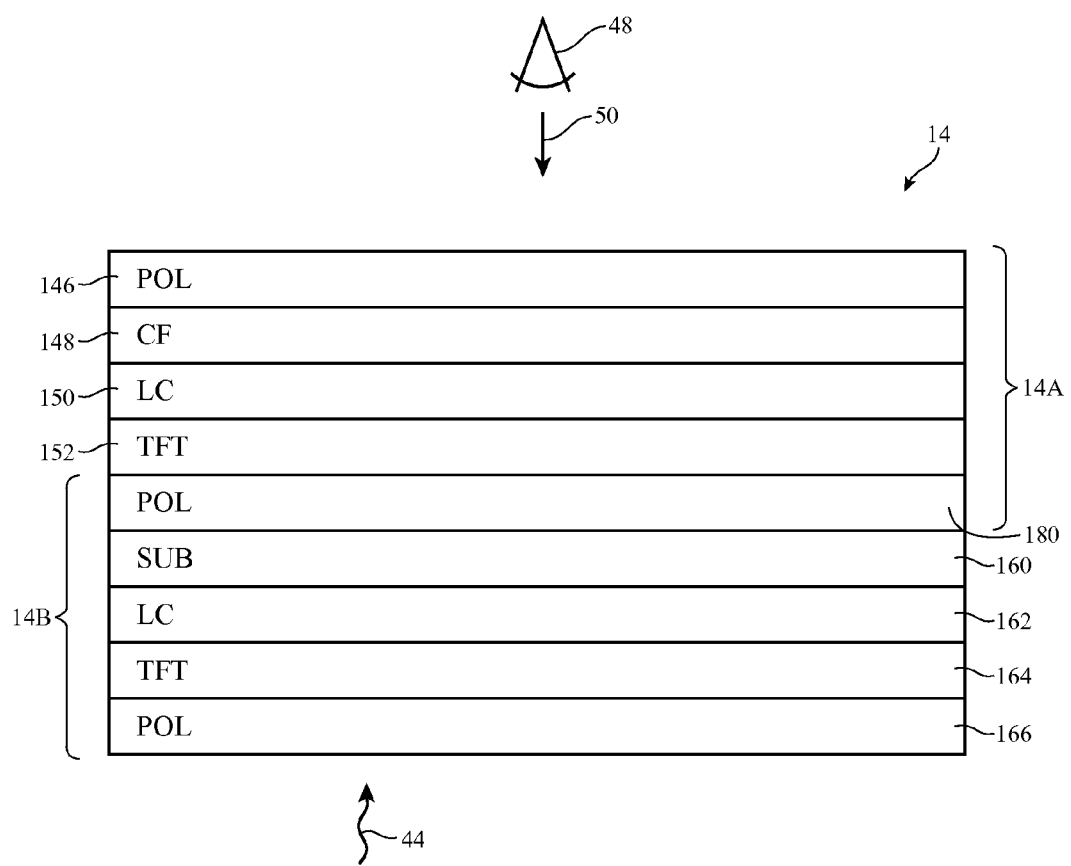
FIG. 14 is a cross-sectional side view of an illustrative display with two stages that share a common polarizer in accordance with an embodiment.

The display of FIG. 13 uses four polarizers. If desired, display 14 may be implemented using three polarizers. As shown in FIG. 14, for example, polarizer 180 may be common to both upper stage 14A and lower stage 14B. Use of a shared polarizer such as polarizer 180 may reduce display cost and complexity and may help minimize light transmission losses.

Figure 15:
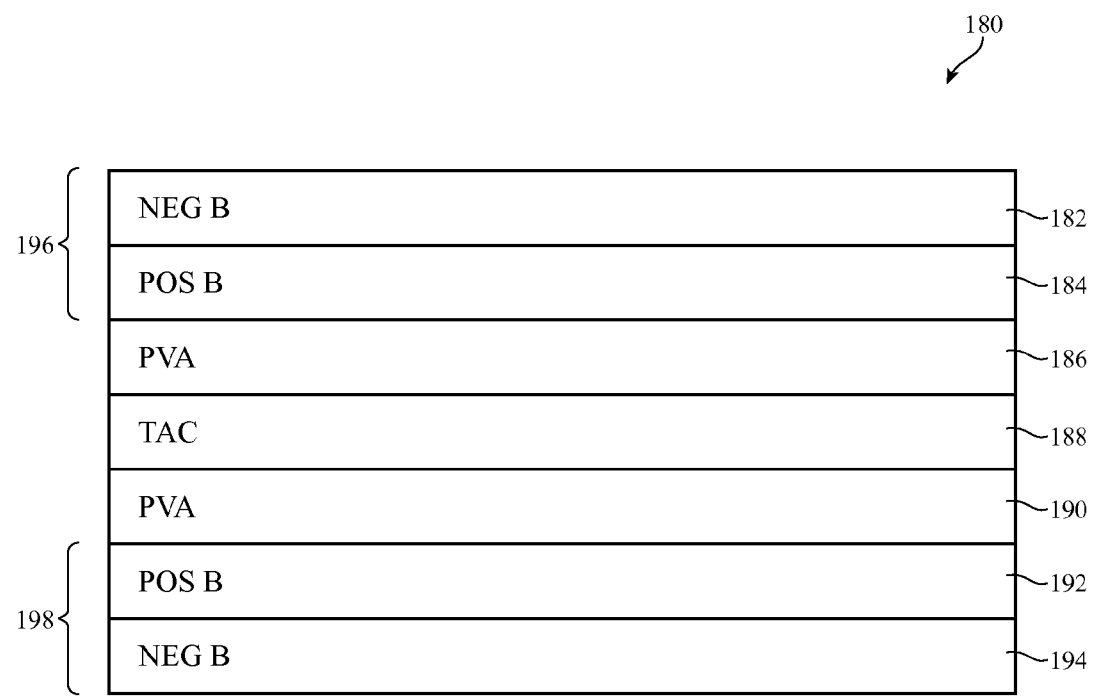
FIG. 15 is a cross-sectional side view of an illustrative polarizer that may be used for the shared polarizer of FIG. 14 in accordance with an embodiment.

If desired, the compensation films for display 14 may be incorporated into shared polarizer 180. An illustrative configuration that may be used for shared polarizer 180 is shown in FIG. 15. As shown in FIG. 15, shared polarizer 180 may include a polymer polarizer film such as polarizer layer 186. Layer 186 may be formed from a stretched polymer such as stretched polyvinyl alcohol. A dichroic dye such as iodine or dichroic organic pigments may be added to the stretched PVA film to provide polarizer layer 186 and polarizer 180 with the ability to polarize light. Polarizer layer 186 may be attached to other polymer layers. For example, polarizer layer 186 may be attached to TAC layer 188 and a polyvinyl alcohol polymer layer without iodine or other dichroic dye such as mechanical PVA layer 190. Upper compensation films 196 may include negative birefringence compensation layer 182 and positive birefringence compensation layer 184 and may be used to provide compensation for stage 14A. Lower compensation films 196 may be include negative birefringence compensation layer 192 and positive birefringence compensation layer 194 and may be used to provide compensation for stage 14B. If desired, compensation films for display 14 of FIG. 14 may be incorporated into layers 70 (see, e.g., FIG. 5) or other polarizers in display 14. The configuration of FIG. 15 is merely illustrative.

Figure 16:
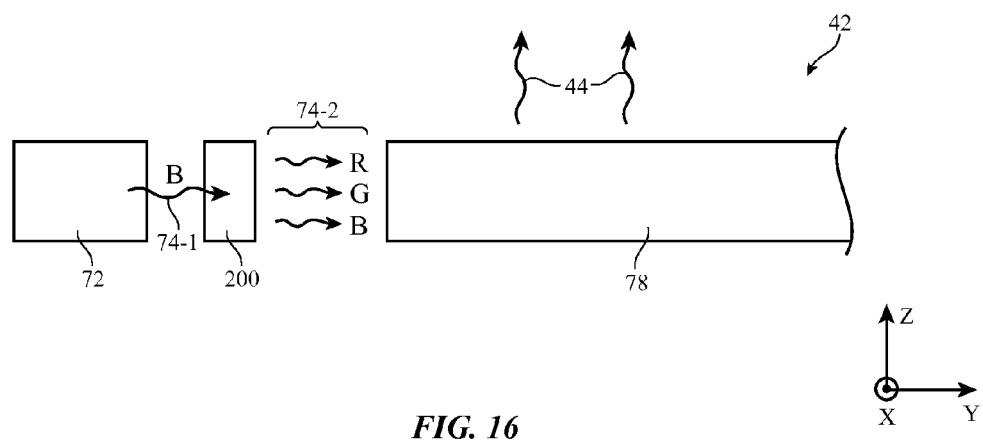
FIG. 16 is a side view of an illustrative backlight having a quantum dot structure in accordance with an embodiment.
Figure 17:
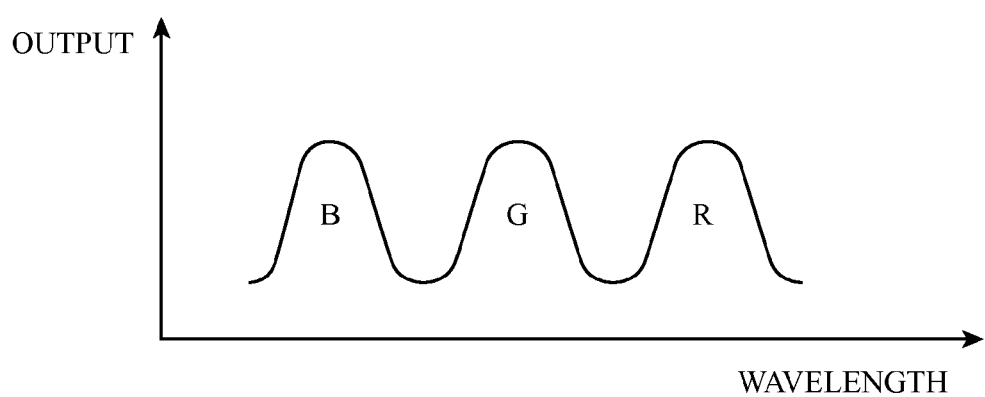
FIG. 17 is a graph of an output spectrum of an illustrative backlight of the type shown in FIG. 16 in accordance with an embodiment.

Quantum dots may be used to provide backlight unit 42 with the ability to generate backlight having a spectrum that is peaked at wavelengths that are aligned with the colors in the color filter elements of color filter layer 148. This allows display 14 to exhibit an enhanced color gamut. An illustrative backlight with a quantum dot structure is shown in FIG. 16. As shown in FIG. 16, backlight 42 may include light source 72, quantum dot structure 200, and light guide plate 78. Light source 72 may include one or more blue light-emitting diodes that produce blue light 74-1. Quantum dot structure 200 receives blue light 74-1 and outputs corresponding light 74-2 at wavelengths associated with red light R, green light G, and blue light B. An illustrative output spectrum for quantum dot structure 200 when illuminated with blue light from light source 72 is shown in FIG. 17.

Light 74-2 may be supplied to edge 76 of light guide plate. Light guide plate 78 may distribute this light laterally in dimensions X and Y, until the light is scattered upwards in direction Z as backlight 44. Backlight 44 travels upwards through the layers of display 14 in direction Z. The spectral peaks of backlight 44 (i.e., the red peak R, green peak G, and blue peak B in the example of FIG. 17) may be aligned with the transmission peaks of the color filter elements in color filter layer 148. For example, if color filter layer 148 has red, green, and blue color filter elements, the transmission spectra of the red, green, and blue color filter elements and the output spectrum of quantum dot structure may be configured so that the red output of structure 200 is aligned with the red transmission wavelength of the red color filter element, so that the green output of structure 200 is aligned with the green transmission wavelength of the green color filter element, so that the blue output of structure 200 is aligned with the blue transmission wavelength.

Figure 18:
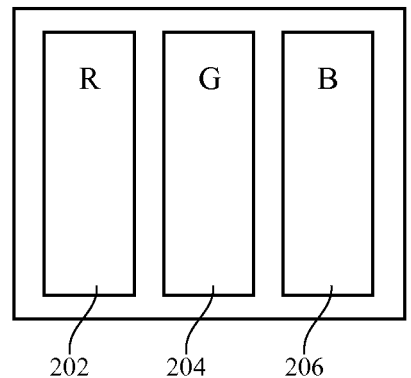
FIG. 18 is a diagram of an illustrative red-green-blue color filter element pattern that may be used for the color filter layer in a display stage in accordance with an embodiment.
Figure 19:
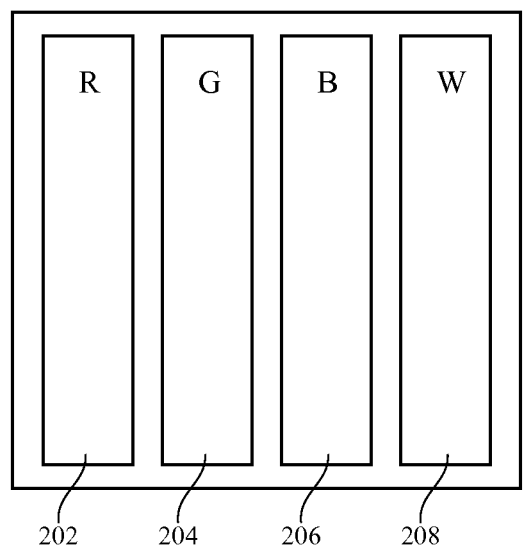
FIG. 19 is a diagram of an illustrative red-green-blue-white color filter element pattern that may be used for the color filter in a display stage in accordance with an embodiment.

FIG. 18 is a top view of an illustrative set of color filter elements that may be used in color filter layer 148 in a display having a color filter array with an array of red, green, and blue color filter elements. Red filter elements such as red element 202 may be used to provide red pixels in upper stage 14A with the ability to supply red light components of an image, green filter elements such as green element 204 may be used to provide green pixels in upper stage 14A with the ability to supply green light components of an image, and blue filter element such as blue element 206 may be used to provide blue pixel in upper stage 14B with the ability to supply blue light components of an image. If desired, light output efficiency may be enhanced by minimizing color filter layer transmission losses. This may be accomplished by incorporating white color filter elements into the color filter array of color filter layer 148. As shown in FIG. 19, each set of color filter elements in this type of configuration will include a white (clear) element such as element 208 in addition to the red, green, and blue elements. The clear color filter element efficiently passes backlight 44 to the viewer without significant transmission losses from light filtering. The backlight that passes through the clear (white) color filter element will appear white due to the presence of color components in the red, green, and blue portions of the spectrum. Configurations of the type shown in FIG. 18 may sometimes be said to use RGB color filters or RGB sub-pixel structures. Configurations of the type shown in FIG. 19 may sometimes be said to use RGBW color filters or RGBW sub-pixel structures.

Figure 20:
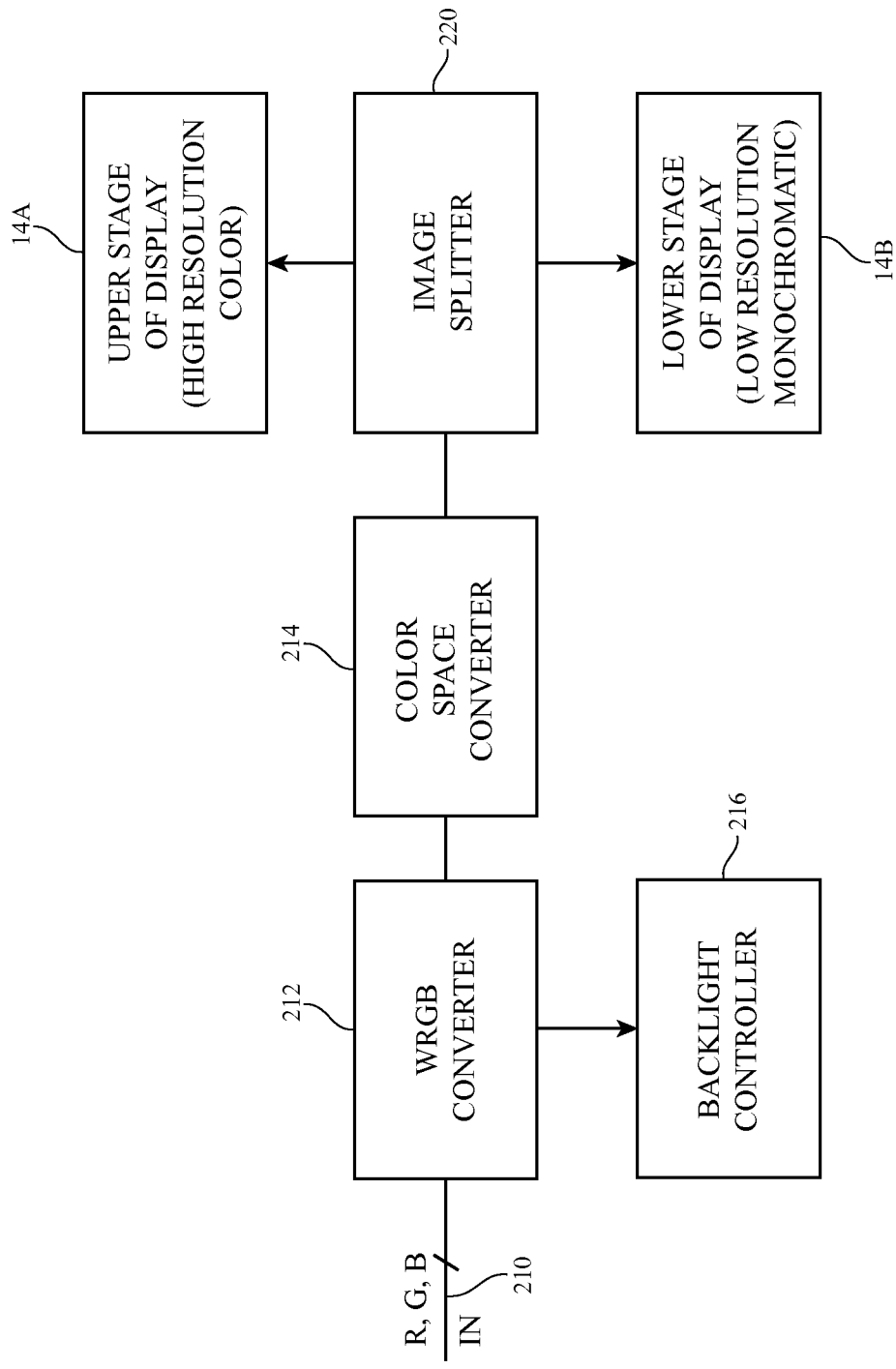
FIG. 20 is a system diagram of a two-stage display and circuitry used for controlling the display in accordance with an embodiment.

FIG. 20 is a diagram of illustrative display control circuitry that may be used in displaying images on display 14. The circuitry of FIG. 20 may be implemented in a display driver circuit (e.g., a timing controller chip), may be implemented using a video card in device 10, may be implemented using other circuitry in device 10 (e.g., microprocessors, application-specific integrated circuits, field-programmable gate arrays, system-on-chip integrated circuits, etc.), or may be implemented using a combination of these resources. The circuitry of FIG. 20 may transform image data that is encoded in red-green-blue format to image data that is encoded in white-red-green-blue format and may perform image splitting operations in which control signals for different aspects of an image to be displayed are allocated between upper stage 14A and lower stage 14B. As shown in FIG. 20, image data to be displayed may be encoded in a red-green-blue (RGB) color space and may be provided to input 210 from control circuitry in device 10. White-red-green-blue (WRGB) converter 212 receives the RGB data on input 210. Converter 212 computes a brightness setting to be used for backlight unit 42 from the data supplied to input 210 and supplies a corresponding brightness control signal to backlight controller 216. Backlight controller 216 adjusts the output produced by light source 72 (see, e.g., FIG. 16) accordingly.

Converter 212 maps RGB data to WRGB data. Color space converter 214 converts the WRGB data to an appropriate color space such as the CIE XYZ color space. Image data can then be split into two channels by image splitter 220. Image splitter 220 may, for example, provide a high resolution color image data component of the image data to upper stage 14A while simultaneously providing a low resolution monochromatic localized dimming component of the image data to lower stage 14B. The local dimming channel of the image data may be derived from the square of luminance Y in the XYZ color space. The color image data channel of the image data may be formed by dividing the Y channel by the square of Y and using this new Y data with corresponding X and Z data to form the final color image data. When displaying the color component of the image on display stage 14A and the lower-resolution local dimming component of the image on display stage 14B, gamma look-up tables may be used to convert the data from image splitter 220 into WRGB data.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    a color stage having pixels with a first pitch;
    a monochromatic stage having pixels with a second pitch that is greater than the first pitch;
    backlight structures that include a light source, that include a quantum dot structure that receives light from the light source, and that include a light guide plate that receives light from the quantum dot structure and provides backlight, wherein the color stage and monochromatic stage are coupled in tandem so that the backlight passes through both the color stage and the monochromatic stage; and
    display circuitry that receives red-green-blue image data, converts the red-green-blue image data into white-red-green-blue image data, computes a brightness setting to be supplied to a backlight controller based on the red-green-blue image data, and splits the white-redgreen-blue image data into a first channel supplied to the color stage and a second channel supplied to the monochromatic stage.

2. The display defined in claim 1 wherein the color stage comprises:
a thin-film transistor layer;
a color filter layer that includes white, red, green, and blue color filter elements; and
a liquid crystal layer interposed between the thin-film transistor layer and the color filter layer.

3. The display defined in claim 1 further comprising a common polarizer that is shared between the color stage and the monochromatic stage.

4. The display defined in claim 3 wherein:
the color stage comprises:
a first thin-film transistor layer;
a color filter layer; and
a first liquid crystal layer between the first thin-film transistor layer and the color filter layer; and
the monochromatic lower stage comprises:
a second thin-film transistor layer;
a transparent substrate; and
a second liquid crystal layer between the second thin-film transistor layer and the transparent substrate.

5. The display defined in claim 4 wherein the common polarizer is interposed between the first thin-film transistor layer and the transparent substrate.

6. A display, comprising:
a color stage having a first layer of liquid crystal material and having pixels with a first pixel pitch;
a monochromatic stage having a second layer of liquid crystal material and having pixels with a second pixel pitch that is greater than the first pixel pitch;
a backlight that produces light using a light source, wherein the color stage and monochromatic stage are coupled in tandem so that the light from the backlight passes through both the color stage and the monochromatic stage, wherein the color stage has a first polarizer, and wherein the monochromatic stage has a second polarizer;
a common polarizer that is shared by the color stage and the monochromatic stage;
a white-red-green-blue converter that is configured to receive red-green-blue image data and convert the red-green-blue image data into white-red-green-blue image data, wherein the white-red-green-blue converter is configured to compute a brightness setting for the backlight based on the red-green-blue image data;
a backlight controller configured to receive the brightness setting from the white-red-green-blue converter and adjust the output of the light source in the backlight based on the brightness setting;
a color space converter configured to convert the white-red-green-blue image data into a color space; and
an image splitter configured to split the white-red-green-blue image data into a first channel supplied to the color stage and a second channel supplied to the monochromatic stage.

7. The display defined in claim 6 wherein the backlight includes quantum dot structures, wherein the color stage has a color filter layer with white, red, green, and blue color filter elements, and wherein the pixels of the monochromatic stage comprise pixels selected from the group consisting of: twisted nematic pixels and in-plane switching pixels.

8. The display defined in claim 6, wherein the color space converter is configured to convert the white-red-green-blue image data into the CIE XYZ color space.

9. A display, comprising:
a color stage having a first layer of liquid crystal material and having pixels with a first pixel pitch;
a monochromatic stage having a second layer of liquid crystal material and having pixels with a second pixel pitch that is greater than the first pixel pitch; and
a backlight that produces light, wherein the color stage and monochromatic stage are coupled in tandem so that the light from the backlight passes through both the color stage and the monochromatic stage, wherein:
the pixels of the color stage are fringe field switching pixels; and
the pixels of the monochromatic stage comprise pixels selected from the group consisting of: twisted nematic pixels and in-plane switching pixels.

10. The display defined in claim 9 wherein the backlight includes quantum dot structures, wherein the display comprises a shared polarizer that forms part of the color stage and part of the monochromatic stage, and wherein the shared polarizer includes at least two negative birefringence layers.

* * * * *

UNITED STATES PATENT AND TRADEMARK OFFICE
CERTIFICATE OF CORRECTION

PATENT NO. : 9,541,794 B2
APPLICATION NO. : 14/502199
DATED : January 10, 2017
INVENTOR(S) : Jiaying Wu et al.

It is certified that error appears in the above-identified patent and that said Letters Patent is hereby corrected as shown below:

On the Title Page

Page 2, Column 1, Item (56) in the U.S. Patent Documents, please add the following:
20070027598   1/2009   Ineko et al.

Signed and Sealed this
First Day of August, 2017

Joseph Matal
*Performing the Functions and Duties of the*
*Under Secretary of Commerce for Intellectual Property and*
*Director of the United States Patent and Trademark Office*